US012775157B2

(12) United States Patent
Li et al.

(10) Patent No.: US 12,775,157 B2
(45) Date of Patent: Oct. 27, 2026

(54) MONOCULAR WITH ADJUSTABLE MAGNIFICATION

(71) Applicant: GUANGDONG SIRUI OPTICAL CO., LTD, Zhongshan (CN)

(72) Inventors: Jie Li, Zhongshan (CN); Kunyi Lin, Zhongshan (CN)

(73) Assignee: GUANGDONG SIRUI OPTICAL CO., LTD, Zhongshan (CN)

( * ) Notice: Subject to any disclaimer, the term of this patent is extended or adjusted under 35 U.S.C. 154(b) by 209 days.

(21) Appl. No.: 18/882,807

(22) Filed: Sep. 12, 2024

(65) Prior Publication Data

US 2026/0036802 A1 Feb. 5, 2026

(30) Foreign Application Priority Data

Jul. 30, 2024 (CN) ......................... 202421833517.4

(51) Int. Cl.

*G02B 23/02* (2006.01)
*G02B 25/00* (2006.01)

(52) U.S. Cl.

CPC ........... *G02B 23/02* (2013.01); *G02B 25/001* (2013.01)

(58) Field of Classification Search

CPC .............................. G02B 23/02; G02B 25/001
See application file for complete search history.

(56) References Cited

U.S. PATENT DOCUMENTS 6,046,853 A * 4/2000 Yano .................... G02B 27/646 359/557

FOREIGN PATENT DOCUMENTS

| | | | | | |
|---|---|---|---|---|---|
| CN | 201345001 | Y | * | 11/2009 | |
| CN | 102360118 | A | * | 2/2012 | |
| CN | 202305995 | U | * | 7/2012 | |
| CN | 104808332 | A | * | 7/2015 | G02B 21/242 |
| CN | 204556955 | U | * | 8/2015 | |
| CN | 107991767 | A | * | 5/2018 | G02B 25/001 |
| CN | 221444967 | U | * | 7/2024 | |
| JP | H11109256 | A | * | 4/1999 | |

* cited by examiner

*Primary Examiner* — Christopher Stanford
(74) *Attorney, Agent, or Firm* — Loeb & Loeb LLP

(57) ABSTRACT

Aspects of the invention disclose a variable-magnification monocular, comprising an objective lens group, a prism group and an eyepiece group arranged in sequence along an optical axis direction, wherein the eyepiece group comprises an eyepiece compensation group, an eyepiece variable-magnification group and an eyepiece fixing group arranged in sequence; the focal lengths of all lens groups satisfy the following conditional formula: $-1.4<F_{31}/F_{32}<-0.9$ and $2<F_{33}/F_{32}<1.7$. The eyepiece magnification group and the eyepiece compensation group may move closer to or farther from each other along the optical axis to achieve continuous change of magnification between 60-20. The monocular may achieve continuous adjustment of the magnification of the monocular by moving the eyepiece zoom group and the eyepiece compensation group closer to or farther from each other along the optical axis, which can meet the needs of different observation objects.

10 Claims, 1 Drawing Sheet

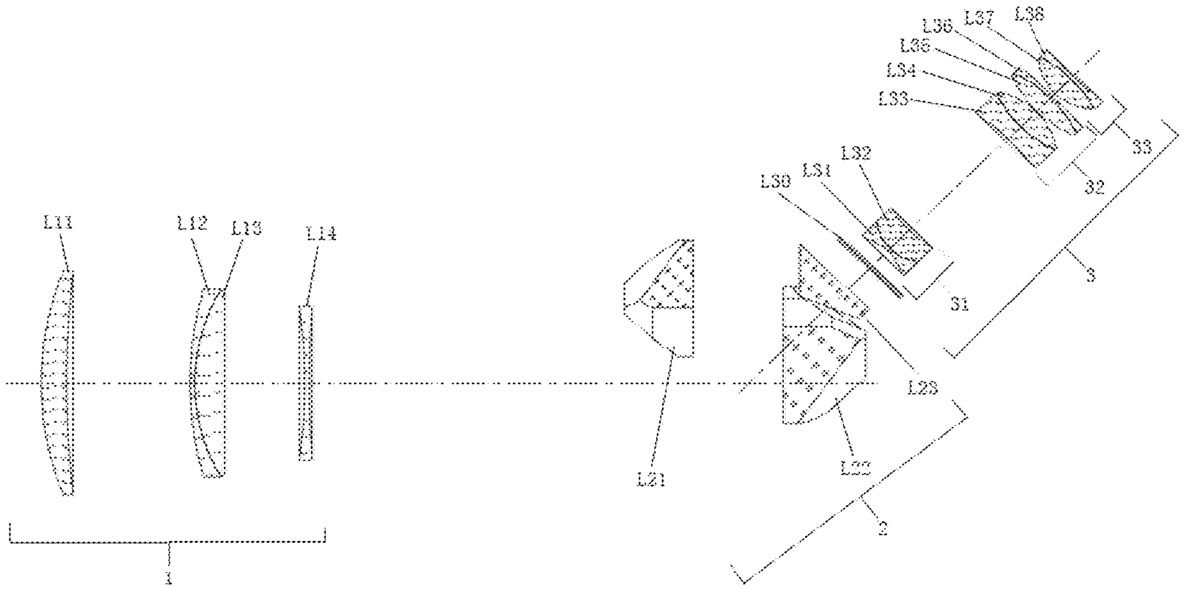
L11
L12
L13
L14
L21
L22
L23
L30
L31
L32
L33
L34
L35
L36
L37
L38
1
2
3
31
32
33

MONOCULAR WITH ADJUSTABLE MAGNIFICATION

TECHNICAL FIELD

Aspects of the invention generally relate to the field of optical lens technology, and in particular to a variable power monocular.

BACKGROUND

A variable-magnification monocular is an optical instrument that can change the field of view by adjusting the magnification. When the magnification is low, the field of view is wider and the objects seen are smaller; when the magnification is increased, the field of view is smaller, but the objects seen are larger and the details are clearer. Variable-magnification monocular have a wide range of applications and can be used for astronomical observations, outdoor adventures, military reconnaissance, bird watching, etc.

However, existing variable-magnification monocular have the defects of low resolution and poor user experience.

SUMMARY

Aspects of the invention attempt to address the technical problem by overcoming the defects of low resolution and poor user experience of variable power monocular in the prior art, thereby providing a variable power monocular via embodiments of the invention.

To solve the above technical problems, aspects of the invention provide:

In one embodiment, a variable power monocular, comprising an object lens group, a prism group and an eyepiece group arranged in sequence along the optical axis direction;

In another embodiment, the object lens group comprises a first object lens with positive focal power, a second object lens with negative focal power, a third object lens with positive focal power, and a fourth object lens with negative focal power arranged in sequence along the optical axis direction from the object side to the observation side;

In yet another embodiment, the eyepiece group comprises a first eyepiece lens with negative focal power, a second eyepiece lens with a positive focal power, and a fourth eyepiece lens with a negative focal power arranged in sequence along the optical axis direction from the object side to the observation side. The third lens of the eyepiece may be of a focal power, the fourth lens of the eyepiece may be of a positive focal power, the fifth lens of the eyepiece may be of a positive focal power, the sixth lens of the eyepiece may be of a negative focal power, the seventh lens of the eyepiece may be of a positive focal power, and the eighth lens of the eyepiece may be of a negative focal power. The first lens of the eyepiece and the second lens of the eyepiece may constitute an eyepiece compensation group. In another embodiment, the third lens of the eyepiece, the fourth lens of the eyepiece, the fifth lens of the eyepiece, and the sixth lens of the eyepiece may constitute an eyepiece variable magnification group. In another embodiment, the seventh lens of the eyepiece and the eighth lens of the eyepiece may constitute an eyepiece fixed group. In yet another embodiment, the focal lengths of all lens groups may satisfy the following conditional formulas:

$$-1.4 < F_{31}/F_{32} < -0.9;$$

$$1.2 < F_{33}/F_{32} < 1.7;$$

Among them, in one embodiment, $F_{31}$ may be the combined focal length of the eyepiece compensation group. In another embodiment, $F_{32}$ may be the combined focal length of the eyepiece magnification group, and $F_{33}$ may be the combined focal length of the eyepiece fixed group;

In yet another embodiment, the magnification of the zoom monocular may be $F_1/F_3$, $20<F_1/F_3<60$, wherein $F_1$ may be the combined focal length of the object lens group, and $F_3$ may be the combined focal length of the eyepiece group. In another embodiment, the eyepiece magnification group and the eyepiece compensation group may be close to or away from each other along the optical axis to achieve a continuous change of the magnification between 60-20.

Further, in some embodiments, the prism group may include a first right-angle prism, a second right-angle prism and a half-pentaprism arranged in sequence from the object side to the observation side along the optical axis. In one aspect, the half-pentaprism may be used to change the direction of the optical axis.

Further, in yet another embodiment, at least one of the first right-angle prism and the second right-angle prism may be movably arranged along the optical axis. In another embodiment, focusing is achieved by moving the first right-angle prism and/or the second right-angle prism.

Further, in some embodiments, the side surfaces of the second lens of the object lens and the third lens of the object lens may be glued together. In some embodiments, the side surfaces of the first lens of the eyepiece and the second lens of the eyepiece may also be glued together. In some embodiments, the side surfaces of the third lens of the eyepiece and the fourth lens of the eyepiece may be glued together. In yet another embodiments, the side surfaces of the fifth lens of the eyepiece and the sixth lens of the eyepiece may be glued together. In a further embodiment, the side surfaces of the seventh lens of the eyepiece and the eighth lens of the eyepiece may be glued together.

Further, in some embodiments, when the eyepiece magnification group moves along the optical axis, the eyepiece compensation group may move in the opposite direction along the optical axis.

Further, in some embodiments, a protective glass (30) may be provided on the side of the eyepiece group close to the prism group.

Further, in some further embodiments, the aperture range of the first lens of the object lens may be 70-90 mm.

Further, when the magnification of the zoom monocular changes between 60 times and 20 times, the exit pupil diameter of the zoom monocular may change within the range of 1.5 mm-4 mm.

Further, in some embodiments, the exit pupil distance of the zoom monocular may be 16-20 mm.

Furthermore, in yet some other embodiments, the total weight of the variable-power monocular may not exceed 1500 g, and the total optical length may not exceed 400 mm.

In some embodiments, aspects of the invention provide the following advantages: by moving the eyepiece variable-power group and the eyepiece compensation group closer to or farther away from each other along the optical axis, the magnification of the variable-power monocular may be continuously adjusted to meet the needs of different observation objects. In addition, under the premise of realizing this feature, high resolution of the center of the field of view and the large field of view may be achieved, and clear imaging may be seen. In some embodiments, the product may further have the advantages of small size, light weight, and low price.

In addition, embodiments of the invention may realize internal focusing through a right-angle prism, and may maintain stable imaging when used at different object distances. Multiple groups of cemented lenses and low-dispersion glass may greatly reduce chromatic aberration.

BRIEF DESCRIPTION OF THE DRAWINGS

In order to more clearly illustrate the specific implementation of the aspects of the invention or the technical solution in the prior art, the following will briefly introduce the drawings required for the specific implementation or the prior art description. Obviously, the drawings described below are some implementations of the aspects of the invention. For ordinary technicians in this field, other drawings may be obtained based on these drawings without creative work.

FIG. 1 is an optical structure diagram of the variable magnification monocular in the embodiment of the present invention when the magnification is 60 times magnification (60×).

Reference number listing: 1. object lens group: L11, first lens of object lens; L12, second lens of object lens; L13, third lens of object lens; L14, fourth lens of object lens; 2. prism group: L21, first right-angle prism; L22, second right-angle prism; L23, half pentaprism; 3. eyepiece group: L30, protective glass; L31, first lens of eyepiece; L32, second lens of eyepiece; L33, third lens of eyepiece; L34, fourth lens of eyepiece; L35, fifth lens of eyepiece; L36, sixth lens of eyepiece; L37, seventh lens of eyepiece; L38, eighth lens of eyepiece.

DETAILED DESCRIPTION

The technical solution of the aspects of the invention may be described clearly and completely below in conjunction with the accompanying drawings. Obviously, the described embodiments are part of the embodiments of the aspects of the invention, not all of the embodiments. Based on the embodiments in the aspects of the invention, all other embodiments obtained by ordinary technicians in the field without creative work are within the scope of protection of the aspects of the invention.

In the description of the aspects of the invention, it should be noted that the orientation or position relationship indicated by the terms "center", "upper", "lower", "left", "right", "vertical", "horizontal", "inside", "outside", etc. is based on the orientation or position relationship shown in the accompanying drawings, which is only for the convenience of describing the aspects of the invention and simplifying the description, rather than indicating or implying that the device or element referred to must have a specific orientation, be constructed and operated in a specific orientation, and therefore cannot be understood as a limitation on the aspects of the invention. In addition, the terms "first", "second", and "third" are only used for descriptive purposes and cannot be understood as indicating or implying relative importance.

The embodiment of the present invention provides a variable magnification monocular to achieve flexible changes in different magnifications, and can see clear images under the premise of realizing this function, and has the advantages of small device size, light weight, and low price.

Referring to FIG. 1, an optical structure diagram of a variable magnification monocular in an embodiment of the present invention when the magnification may be 60 times magnification (60×). In another embodiment, a monocular may include an object lens group 1, a prism group 2, and an eyepiece group 3 arranged in sequence from the object side to the observation side along the optical axis.

In some embodiments, the object lens group 1 may include a first object lens L11 with a positive focal length, a second object lens L12 with a negative focal length, a third object lens L13 with a positive focal length, and a fourth object lens L14 with a negative focal length. In another embodiment, these lenses L11, L12, L13, and L14 may be arranged in sequence from the object side to the observation side along the optical axis.

In another embodiment, the prism group 2 may include a first right-angle prism L21, a second right-angle prism L22, and a half-pentaprism L23 arranged in sequence from the object side to the observation side along the optical axis. The half-pentaprism L23 may change the direction of the optical axis, which is not only convenient for observation, but also may help to shorten the total length of the finished monocular.

In yet another embodiment, the eyepiece group 3 may include a protective glass L30, which may be arranged in sequence from the object side to the observation side along the optical axis direction. In one aspect, the eyepiece group 3 may include a first eyepiece lens L31 with negative focal power, a second eyepiece lens L32 with positive focal power, a third eyepiece lens L33 with negative focal power, a fourth eyepiece lens L34 with positive focal power, a fifth eyepiece lens L35 with positive focal power, a sixth eyepiece lens L36 with negative focal power, a seventh eyepiece lens L37 with positive focal power, and an eighth eyepiece lens L38 with negative focal power. In one aspect, among them, the first eyepiece lens L31 and the second eyepiece lens L32 may constitute an eyepiece compensation group 31; the third eyepiece lens L33, the fourth eyepiece lens L34, the fifth eyepiece lens L35, and the sixth eyepiece lens L36 may constitute an eyepiece magnification group 32. In some embodiments, the seventh eyepiece lens L37 and the eighth eyepiece lens L38 may constitute an eyepiece fixed group 33.

In some embodiments, the focal lengths of all lens groups may satisfy the following conditional formula:

$$-1.4 < F_{31}/F_{32} < -0.9;$$

$$1.2 < F_{33}/F_{32} < 1.7;$$

Among them, in one embodiment, $F_{31}$ may be the combined focal length of the eyepiece compensation group (31). In yet another embodiment, the $F_{32}$ may be the combined focal length of the eyepiece magnification group (32), and $F_{33}$ may be the combined focal length of the eyepiece fixed group (33).

In yet another embodiment, the magnification of the monocular may be $F_1/F_3$, $20<F_1/F_3<60$, wherein $F_1$ may be the combined focal length of the object lens group 1, and $F_3$ may be the combined focal length of the eyepiece group 1. When the magnification of the monocular is 60, the ratio of $F_1/F_3$ may be 60. When the magnification of the monocular is 20, the ratio of $F_1/F_3$ may be 20.

In another embodiment, the eyepiece magnification group 32 and the eyepiece compensation group 31 may be close to or away from each other along the optical axis direction to achieve the change of the magnification of the zoom monocular, and may achieve continuous change between 60-20 times of the monocular.

In this embodiment, the side surfaces of the object lens second lens L12 and the object lens third lens L13 may be glued together; the side surfaces of the eyepiece first lens L31 and the eyepiece second lens L32 may be glued together; the side surfaces of the eyepiece third lens L33 and the eyepiece fourth lens L34 may be glued together; the side surfaces of the eyepiece fifth lens L35 and the eyepiece sixth lens L36 may be glued together; the side surfaces of the eyepiece seventh lens L37 and the eyepiece eighth lens L38 may be glued together. In one embodiment, the gluing of positive and negative lenses may greatly improve the chromatic aberration problem to the monocular during magnification adjustment. At the same time, the total length of the overall optical system is shortened after the lenses are glued.

In yet another embodiment, when the eyepiece magnification group 32 moves along the optical axis, the eyepiece compensation group 31 may move in the opposite direction along the optical axis to offset the image plane movement caused by the movement of the eyepiece magnification group 32, thereby achieving a continuous change of the magnification of 20 to 60 times. In yet another embodiment, the magnification may be more than 60 times. In some embodiments, when the distance between the eyepiece magnification group 32 and the eyepiece compensation group 31 increases, the combined focal length $F_3$ of the eyepiece group 3 gradually becomes shorter. In yet another embodiment, the combined focal length $F_1$ of the object lens group 1 remains unchanged, while the magnification of the monocular increases, and the objects appear larger. In another aspect, when the distance between the eyepiece magnification group 32 and the eyepiece compensation group 31 decreases, the combined focal length $F_3$ of the eyepiece group 3 gradually becomes longer, the combined focal length $F_1$ of the object lens group 1 remains unchanged, while the magnification of the monocular decreases, the objects appear smaller, and the field of view becomes wider.

In another embodiment, at least one of the first right-angle prism L21 and the second right-angle prism L22 in the prism group 2 may be movable along the optical axis. For example, the first right-angle prism L21 may move forward and backward along the optical axis, thereby changing the total optical length in the optical axis direction to achieve focusing. However, since the right-angle prism itself has the function of folding the optical path and changing the direction of the optical path, the total length of the product may not change even if the prism moves forward and backward.

Among them, the aperture range of the first object lens L11 of the variable magnification monocular may be 70 to 90 mm.

When the magnification of the variable-power monocular changes between 60 magnifications and 20 magnifications, the pupil diameter of the variable-power monocular in the range of 1.5 mm to 4 mm. In another embodiment, the pupil distance of the variable-power monocular may change in the range of 16 to 20 mm. In some embodiments, the longer pupil distance may convenient for different groups of people to use.

In another embodiment, the total weight of the finished variable-power monocular may not exceed 1500 g, and the total optical length may not exceed 400 mm. In another embodiment, this lightweight and small variable-power monocular improves the portability of the product.

Table 1 below lists the parameters of each lens of aspects of the invention that may conform to the above mathematical relationship:

TABLE 1

| Lens | Number | Y diameter (mm) | Thickness (mm) | Refractive Index | Abbe Number |
|---|---|---|---|---|---|
| Object first lens | 1 | 104.642 | 10.82 | 1.483 | 83.59 |
| | 2 | 392.307 | 44.87 | | |
| Object second lens | 3 | 309.984 | 1.84 | 1.749 | 43.92 |
| Object third lens | 4 | 70.492 | 10.52 | 1.468 | 77.11 |
| | 5 | Infinity | 28.11 | | |
| Object fourth lens | 6 | −306.425 | 1.65 | 1.499 | 65.00 |
| | 7 | 508.025 | 183.07 | | |
| Prism Group | / | / | / | / | / |
| | 8 | Infinity | 14.69 | | |
| Protective Glass | 9 | Infinity | 2.14 | 1.517 | 64.20 |
| | 10 | Infinity | D(10) | | |
| Eyepiece first lens | 11 | −21.377 | 1.24 | 1.578 | 70.00 |
| Eyepiece second lens | 12 | 37.827 | 10.89 | 1.952 | 28.76 |
| | 13 | 43.191 | D(13) | | |
| Eyepiece third lens | 14 | −70.526 | 6.30 | 1.921 | 27.50 |
| Eyepiece fourth lens | 15 | 59.853 | 8.13 | 1.631 | 58.49 |
| | 16 | −33.810 | 0.35 | | |
| Eyepiece fifth lens | 17 | 41.775 | 9.52 | 1.712 | 56.26 |
| Eyepiece sixth lens | 18 | −38.243 | 1.33 | 1.708 | 23.44 |

TABLE 1-continued

| Lens | Number | Y diameter (mm) | Thickness (mm) | Refractive Index | Abbe Number |
|---|---|---|---|---|---|
| | 19 | −117.731 | D(19) | | |
| Eyepiece seventh lens | 20 | 18.259 | 8.50 | 1.612 | 51.07 |
| Eyepiece eighth lens | 21 | −52.865 | 1.18 | 1.865 | 29.70 |
| | 22 | 113.771 | 19.50 | | |

When the monocular changes from 60 times to 20 times, the space parameters change as shown in Table 2:

TABLE 2

| | 60 times | 20 times |
|---|---|---|
| D(10) | 2.38 | 14.32 |
| D(13) | 52.06 | 9.09 |
| D(19) | 3.00 | 34.03 |

According to Table 2, in another embodiment, D(10) may be the central space or distance between the eyepiece first tens L31 and the protective glass L30 in the optical axis direction. In another embodiment, D(13) may be the central space or distance between the eyepiece second lens L32 and the eyepiece third lens L33 in the optical axis direction. In yet another embodiment, D(19) may be the central space or distance between the eyepiece sixth lens L36 and the eyepiece seventh lens L37 in the optical axis direction.

In summary, this variable-power magnification includes the following advantages:

First, aspects of the invention may achieve high resolution in the center of the field of view and the large field of view, and the use of multiple groups of cemented lenses and low-dispersion glass can greatly reduce chromatic aberration;

Second, by moving the eyepiece variable-power group 32 and the eyepiece compensation group 31 closer to or farther away from each other along the optical axis, the magnification of the variable-power monocular may be continuously adjusted to meet the needs of different observation objects;

Third, aspects of the invention may achieve internal focusing through a right-angle prism, and can maintain stable imaging under different object distances;

Fourth, aspects of the invention may greatly shorten the total length of the optical system through a reasonable lens arrangement, thereby reducing the weight of the finished product and bringing great convenience to the user.

Obviously, the above embodiments are only examples for clear explanation, and are not limitations on the implementation methods. For ordinary technicians in the field, other different forms of changes or modifications may be made on the basis of the above description. It is not necessary and impossible to list all the implementation methods here. And the obvious changes or modifications derived from this are still within the scope of protection of the invention of the utility model.

What is claimed is:

1. A monocular with an adjustable magnification comprising:

an object lens group (1), a prism group (2) and an eyepiece group (3) arranged in sequence along an optical axis direction;

wherein the object lens group (1) comprises a first object lens (L11) with positive focal power, a second object lens (L12) with negative focal power, a third object lens (L13) with positive focal power, and a fourth object lens (L14) with negative focal power, wherein the first object lens, the second object lens, and third object lens are arranged in sequence along the optical axis direction from an object side to an observation side;

wherein the eyepiece group (3) comprises a first eyepiece lens (L31) with negative focal power, a second eyepiece lens (L32) with positive focal power, a third eyepiece lens (L33) with negative focal power, and a fourth eyepiece lens (L34) with positive focal power, a fifth eyepiece lens (L35) with positive focal power, a sixth eyepiece lens (L36) with negative focal power, a seventh eyepiece lens (L37) with positive focal power, and an eighth eyepiece lens (L38) with negative focal power, wherein the first eyepiece lens, the second eyepiece lens, the third eyepiece lens, the fourth eyepiece lens, the fifth eyepiece lens, the sixth eyepiece lens, the seventh eyepiece lens, and the eighth eyepiece lens are arranged in sequence along the optical axis direction from the object side to the observation side;

wherein the first eyepiece lens (L31) and the second eyepiece lens (L32) constitute an eyepiece compensation group (31);

wherein the third eyepiece lens (L33), the fourth eyepiece lens (L34), the fifth eyepiece lens (L35), and the sixth eyepiece lens (L36) constitute an eyepiece variable magnification group (32);

wherein the seventh eyepiece lens (L37) and the eighth eyepiece lens (L38) constitute an eyepiece fixed group (33);

wherein focal lengths of lens groups satisfy the following formula:

$$-1.4 < F_{31}/F_{32} < -0.9;$$

$$1.2 < F_{33}/F_{32} < 1.7;$$

wherein, $F_{31}$ comprises a combined focal length of the eyepiece compensation group (31), $F_{32}$ comprises the combined focal length of an eyepiece magnification group (32), and $F_{33}$ comprises the combined focal length of an eyepiece fixed group (33);

wherein the adjustable magnification comprises $F_1/F_3$ with a magnification relationship of $20<F_1/F_3<60$;

wherein $F_1$ comprises the combined focal length of the object lens group (1), and $F_3$ comprises the combined focal length of the eyepiece group (1);

wherein the eyepiece magnification group (32) and the eyepiece compensation group (31) are configured to move closer to or farther from each other along the optical axis direction to achieve a continuous change of a magnification between 20 to 60 times.

2. The adjustable magnification monocular according to claim 1, wherein the prism group (2) comprises a first right-angle prism (L21), a second right-angle prism (L22) and a half-pentaprism (L23) arranged in sequence from the object side to the observation side along the optical axis; wherein the half-pentaprism (L23) is configured to change a direction of the optical axis.

3. The adjustable magnification monocular according to claim 2, wherein at least one of the first right-angle prism (L21) and the second right-angle prism (L22) is configured to move along the optical axis;

wherein moving the first right-angle prism (L21) and/or the second right-angle prism (L22) is configured to focus.

4. The adjustable magnification monocular according to claim 1, wherein side surfaces of the object lens second lens (L12) and the object lens third lens (L13) are glued together;

wherein side surfaces of the eyepiece first lens (L31) and the eyepiece second lens (L32) are glued together;

wherein side surfaces of the eyepiece third lens (L33) and the eyepiece fourth lens (L34) are glued together;

wherein side surfaces of the eyepiece fifth lens (L35) and the eyepiece sixth lens (L36) are glued together; and wherein side surfaces of the eyepiece seventh lens (L37) and the eyepiece eighth lens (L38) are glued together.

5. The adjustable magnification monocular according to claim 1, when the eyepiece variable magnification group (32) moves along the optical axis, the eyepiece compensation group (31) is configured to in an opposite direction along the optical axis.

6. The adjustable magnification monocular according to claim 1, wherein a protective glass (30) is provided on a side of the eyepiece group (3) close to the prism group (2).

7. The adjustable magnification monocular according to claim 1, wherein an aperture range of the first lens (L11) of the object lens comprises 70-90 mm.

8. The adjustable magnification monocular according to claim 1, when the magnification of the adjustable magnification monocular changes between 60 times and 20 times of magnification, an exit pupil diameter of the adjustable magnification monocular changes within the range of 1.5 mm to 4 mm.

9. The adjustable magnification monocular according to claim 1, when the magnification of the adjustable magnification monocular changes between 60 times and 20 times of magnification, the exit pupil distance of the adjustable magnification monocular is 16 to 20 mm.

10. The adjustable magnification monocular according to claim 1, wherein a total weight of the adjustable magnification monocular is equal or less than 1500 g, and a total optical length is equal or less than 400 mm.

* * * * *